No. 867,393.
PATENTED OCT. 1, 1907.
G. MERRITT.
BEARING FOR PEDALS.
APPLICATION FILED DEC. 28, 1906.
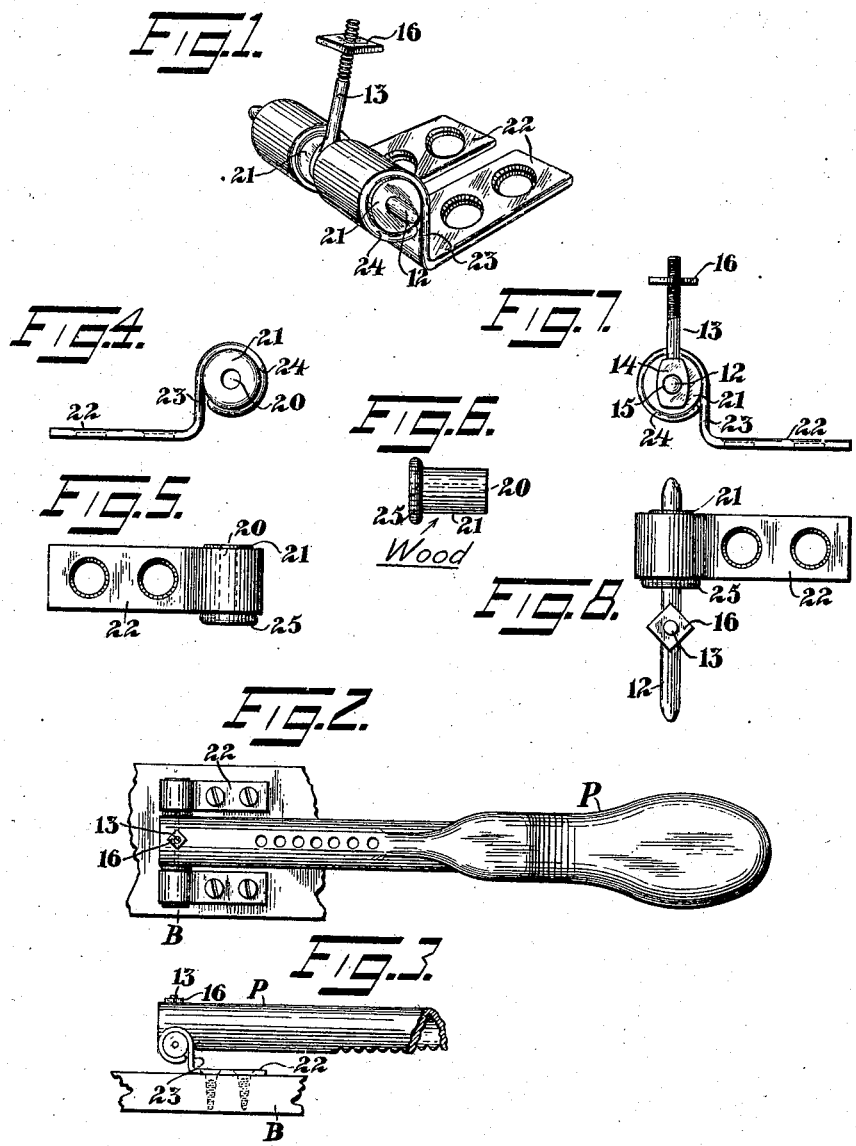
Witnesses:
Harry Fleischer
H. D. Penney
Inventor:
Gordon Merritt.
By his Attorney,
F. H. Richards.

UNITED STATES PATENT OFFICE.

GORDON MERRITT, OF RIDGEWOOD, NEW JERSEY, ASSIGNOR TO HAMMACHER, SCHLEMMER & COMPANY, OF NEW YORK, N. Y., A CORPORATION OF NEW JERSEY.

BEARING FOR PEDALS.

No. 867,393.  Specification of Letters Patent.  Patented Oct. 1, 1907.

Application filed December 28, 1906. Serial No. 349,803.

*To all whom it may concern:*

Be it known that I, GORDON MERRITT, a citizen of the United States, residing in Ridgewood, in the county of Bergen and State of New Jersey, have invented certain new and useful Improvements in Bearings for Pedals, of which the following is a specification.

This invention relates to bearings especially adapted for use in pedals and other mountings for musical instruments such as pianos and organs.

The object of the invention is to provide an improved form of bearing that will do away with vibration, and that will not work loose, and which furthermore will not produce a squeak or other noise.

A further object of the invention is to provide a form of bearing that will be very simple and economical to manufacture and which can be easily and quickly assembled; and in which the engaging portion of the bearing member can be easily and cheaply renewed when desired.

In the accompanying drawing representing an embodiment of my invention, Figure 1 is a perspective view of the device with the pedal removed. Fig. 2 is a plan view of the device in position. Fig. 3 is an elevation of the parts shown in Fig. 2, part of the pedal and base being broken off. Fig. 4 is a side elevation of the bearing member, and Fig. 5 a plan view of the same. Fig. 6 shows the bushing member removed. Fig. 7 shows a pedal pin in position in one bearing, with the clamping bolt on the pin; and Fig. 8 is a similar view in plan.

The pedal P may have the pedal pin 12 secured thereto in any suitable manner. In the construction shown a bolt 13 having a head 14 containing an aperture 15, is slid on the pedal pin to its middle part. On the threaded end of the bolt 13 is a nut 16. The pin is inserted through a suitable aperture in the pedal, that is shown as somewhat half-round, and the nut is screwed on which will cause the pedal pin to bind tightly on the two side edges of the pedal, securely holding the pin in position, and preventing rotation thereof in the pedal. This pin rotates in the bore 20 of a suitable wooden bearing member 21 the pin having a snug fit in the wooden bearing. A pair of these are provided, one on each end portion of the pin at the sides of the pedal. Suitable means are provided for securely holding the wooden bearing members 21.

In the construction illustrated, there are a pair of brackets formed from a resilient plate and comprising a straight portion 22 preferably apertured for attachment to the base by screws or other desired means. The plate is then bent upward at 23 at a right angle and thence bent in the form of a cylindrical loop 24, with the extremity of the loop not in engagement with the base; whereby a resilient socket is provided for the bushing member 21. This bushing is shown as formed cylindrical and is of a diameter to snugly fit in the loop 24 with sufficient friction to prevent rotation in the loop. A pair of these brackets are provided and secured to the base B on each side of the pedal as indicated in Fig. 2. The bushings 21 are preferably provided with flanges 25 at one end, and these flanges are placed at the inner end adjacent the pedal. By this construction, there is not only provided a wooden bearing for the pin itself, but the bushing forms an end thrust bearing on each side of the pedal, that will prevent side movement of the pedal, and also prevent any squeak or other sound by the friction between the sides of the pedal and its bearing. This provides a structure that is obviously very cheap and simple to manufacture, the brackets being simple bars apertured and bent to form loops, in which the wooden bushings are inserted with their flange engaging the side of the loop. These are placed on the end portions of the pin with the flanges engaging the pedal, and then the brackets are secured to the base by screws or otherwise. When it is desired to renew one or both of the bushing members, it is merely necessary to loosen and remove one of the bracket members from the base, when the pedal can be removed from the other bracket member, and one or both of the bushings replaced by another. The removed bracket is then again placed on the pedal pin and secured in position.

Having thus described my invention, I claim:

1. In a pedal bearing, a pair of bearing members each having a resilient loop portion, a pair of tubular wooden bushings each having a flange at one end, each bushing being inserted in a loop with its flange engaging one end thereof and retained in the loop by the resilient structure thereof, and a pedal pin having its extremities rotatable in the wooden bushings.

2. In a pedal bearing, a pedal pin, a pair of bearing members each formed of a flat strip having a resilient loop portion at one end, tubular wooden bushings each having a flange at one end, the bushings being inserted in the loop portions of the bearing members and securely retained therein by the resilient structure of the loops, the end portions of the pin being rotatable in said wooden bushings, with the flanges of the bushings adjacent the pedal.

GORDON MERRITT.

Witnesses:
LOUIS SCHMIDT,
MAURICE L. KEMPE.